3,080,297
PRODUCTION OF GLUTAMIC ACID
Thomas Phillips, Edwardsville, and Norman L. Somerson, Elysburg, Pa., assignors to Merck & Co., Inc., Rahway, N.J., a corporation of New Jersey
No Drawing. Filed July 11, 1960, Ser. No. 38,413
12 Claims. (Cl. 195—47)

This invention relates generally to a method for the microbiological production of L(+)-glutamic acid. More particularly, it relates to an improved process for the direct production of glutamic acid by fermentation. Still more specifically, it is concerned with a method for obtaining high yields of glutamic acid by fermentation of a suitable nutrient medium with a biotin-requiring microorganism.

This application is a continuation-in-part of our application Serial No. 832,147, filed August 7, 1959, now abandoned.

The economical production of glutamic acid is of considerable commercial importance since the monosodium salt thereof is highly useful as a flavoring agent in many food products. Several methods of obtaining or producing glutamic acid are reported in the scientific and patent literature. Most of these are either chemical methods which lead to the racemic form of glutamic acid and require a resolution step to obtain the natural form, or isolation methods wherein glutamic acid is recovered from various natural sources. There have also been reports on the production of glutamic acid from α-keto glutaric acid. All of these methods, however, leave much to be desired in that they are expensive, low yielding or dependent upon difficultly available starting materials.

It has only been recently that the production of the naturally occurring form of glutamic acid by direct fermentation of a nutrient medium with a suitable microorganism has been reported. Thus, Canadian Patent No. 562,728, issued September 2, 1958, and Canadian Patent No. 588,846, issued December 15, 1959, describe syntheses of L(+)-glutamic acid with various microorganisms including those identified as strains of *Micrococcus glutamicus*; U.S. Patent No. 8,789,939, issued April 23, 1957, discloses the production of glutamic acid by fermentation with strains of *Cephalosporium C*. More recently, Chao and Foster have described glutamic acid synthesis with a bacillus identified as a *Bacillus megaterium-Bacillus cereus* intermediate type ("A Glutamic Acid-Producing Bacillus," J. Bact., 77, 715, 1959). Other species of microorganisms reported to produce L-glutamic acid are of the genera *Brevibacterium, Pseudomonas, Aspergillus* and *Arthrobacter*.

Certain of the microorganisms heretofore reported as capable of producing glutamic acid have also been found to require biotin for growth. It has further been observed, however, that, while biotin is necessary for growth of the organism, excessive biotin present in the fermentation medium causes extremely abundant and luxuriant growth which affects adversely the production of glutamic acid. In other words, although a certain amount of biotin is essential for these biotin-requiring, glutamic-acid-producing microorganisms to grow, the presence of excess biotin permits rampant growth at the expense of glutamic acid production. It will be appreciated by those skilled in this art that this property of the biotin-requiring, glutamic acid-producing microorganisms is a serious drawback to the economical production of glutamic acid, since many of the commonly employed nutrient materials have a relatively high biotin content. Although the optimum biotin concentration can be achieved without undue difficulty in a totally synthetic medium, this has not heretofore been possible in media containing naturally occurring nutrient sources such as molasses and corn steep liquor. This has presented a serious problem since synthetic media are usually expensive and not normally preferred for large scale fermentations.

According to the present invention, it has been found that the growth of a biotin-requiring organism in a fermentation medium containing biotin may be effectively limited or controlled by addition of an inhibitor to the fermenting medium. It has been further discovered that when the growth of such organisms is thus controlled or limited, the ability of the organism to produce glutamic acid is not adversely affected, and glutamic acid is accumulated in significant amounts. This is an important feature of our invention since some methods of limiting growth of the organism also limit glutamic acid formation, and such methods would not be satisfactory.

It is an object of the present invention to provide a microbiological method for producing glutamic acid with a biotin-requiring organism in a medium containing excess biotin. It is a further object to provide a method for counteracting or neutralizing the adverse effect of excess biotin on accumulation of glutamic acid. It is a still further object to provide a method for controlling or limiting the growth of a biotin-requiring microorganism in the presence of excess biotin. Still another object is the provision of a fermentation process for making glutamic acid with a biotin-requiring organism which permits the use of inexpensive naturally occurring nutrient materials. Other objects will be evident from the following detailed discussion of our invention.

As stated above, many of the microorganisms capable of producing glutamic acid by direct fermentation require biotin in order to grow. However, as taught by Canadian Patent No. 562,728 and by the Chao and Foster article referred to above, there is an inverse relationship between the amount of cell growth and the amount of glutamic acid produced. Thus, when the biotin content of the medium exceeds a certain optimum level the organism grows very luxuriantly and uncontrollably but at the expense of glutamic acid formation. It has been observed that with most of the biotin-requiring, glutamic acid-producing microorganisms, a biotin concentration of about 1.0–5.0 parts per billion (i.e. 1–5 micrograms per liter) in the nutrient medium is optimum for both growth and glutamic acid formation. While this concentration can be controlled in a synthetic medium, many of the readily available and normally employed sources contain as much as 0.3γ/gm. of biotin. When these materials are employed as nutrients, levels of biotin in fermentation broth of as high as 30–50 parts per billion result. If left uncontrolled, the organism in such a medium will grow to such an extent that no significant amount of glutamic acid is formed.

We have found that when a minor amount of a suitable inhibitor is added to the fermentation medium after an initial period of microorganism growth, the growth of the organism is effectively stopped and significant amounts of glutamic acid are then accumulated in the medium. As the inhibitor, we prefer to employ an antibiotic such as penicillin, cephalosporin C, oxamycin, novobiocin, oxytetracycline, chlortetracycline, tetracycline, streptomycin, bacitracin and the like. However, other inhibitors such as phenol, sodium propionate, resorcinol, cetyltrimethylammonium bromide and the like may be used with success if so desired.

Of the inhibitors useful in this invention, we prefer to employ an antibiotic of the group exemplified by penicillin, cephalosporin and oxamycin. Of these, penicillin is highly satisfactory. When referring to penicillin herein, the term is intended to include the various members of the penicillin group such as penicillin G, α-phenoxyethyl penicillin, phenoxymethyl penicillin, and other so-called "synthetic penicillins" which may be produced by methods known in the art.

The penicillin is normally added to the fermenting medium in the form of a salt such as the procaine, dibenzylethylenediamine, or like amino salts, or a metal salt such as calcium, sodium or potassium penicillin. Since the fermentation is conducted in an aqueous medium, it is convenient to employ a water-soluble penicillin salt and for this purpose we prefer to use an aqueous solution of potassium or sodium penicillin. Only minor amounts of antibiotic are required. Growth inhibition with resulting glutamic acid accumulation is obtained when as little as 0.05 unit of penicillin per ml. of fermentation broth is added although for optimum results it is preferred to employ from about 0.2 to about 10 units/ml. of broth. Larger amounts do not affect the accumulation of glutamic acid and may be used if desired. The optimum amount will vary somewhat, increasing with the biotin content of the medium.

In accordance with the invention, the inhibitor, such as penicillin, is added to the fermentation after an initial growth of the organism has been completed. Thus, it is desirable that the organism grow approximately to the extent that would take place in the presence of about 1.0–5.0 parts per billion of biotin. Cell growth is conveniently followed by measuring the optical density of the fermentation medium at periodic intervals by the method described in Example 1. The inhibitor is preferably added when the optical density of the whole broth is within the range of about 15 to 30. It should be pointed out, however, that this represents a preferred aspect of the invention and that advantageous results are obtained when the inhibitor is charged at an earlier or later stage of the fermentation, and good results have been obtained by adding it when the optical density of the medium reaches a value of about 5. It will be appreciated by those skilled in this art that these optical density figures can be converted to percent increase in cell volume and this increase employed as the measure of growth. In most cases, some growth of the microorganism and increase in cell volume will continue after addition of the inhibitor, but the increase is not a continuous and uncontrolled one.

The inhibitors which are preferred for use in our invention are those which alter the permeability of the cell wall or cell membrane of the biotin-requiring, glutamic acid-producing microorganism so that the glutamic acid elaborated by the organism may be released to the fermentation medium. Such release of glutamic acid to the surrounding medium by the cell permits the organism to continually biosynthesize glutamic acid, which it would not otherwise be able to do. The inhibitors most satisfactory in the process of this invention are those which cause the ratio of extracellular glutamic acid to intracellular glutamic acid to be greater than 50. They also in most instances cause a decrease of at least about 50% in the level of intracellular glutamic acid over the level of intracellular glutamic acid found when the inhibitor is not used. We have found that the antibiotics penicillin, cephalosporin C, streptomycin and oxamycin are highly efficient and satisfactory inhibitors.

The fermentation itself, including the composition of the nutrient media and the conditions employed, are those known in the art as suitable for the direct production of glutamic acid in a nutrient medium with a biotin-requiring, glutamic acid-producing microorganism. The nutrient medium should contain a source of carbon and nitrogen, and normally also contains minor amounts of salts and minerals such as phosphate, sulfate, magnesium, manganese and potassium. In some cases, these minor components may be supplied by the nutrient used as a carbohydrate source. Of course, the medium also contains biotin.

As the carbohydrate source we may use any of those materials which are normally employed in the fermentation art, such as dextrin, beet molasses, cane molasses, corn syrup, blackstrap molasses, hi-test molasses, and the like. Essentially, all of these materials contain biotin and act as a source of biotin for the organism. When employed in the amounts required to furnish sufficient carbohydrate, however, an excessive amount of biotin is frequently introduced and it is for this reason that addition of inhibitors, and preferably of antibiotics, in accordance with our invention becomes necessary. In referring to an excessive amount of biotin, we mean an amount above the concentration required for both optimal growth and glutamic acid production. The nitrogen may be furnished by organic or inorganic salts, or by complex nutrients such as corn steep liquor, ammonia or urea. In those cases where the nitrogen source contains biotin, the inhibitor will, of course, overcome the adverse effect of any such excess biotin.

It is important that the pH of the fermentation medium be controlled for optimum production of glutamic acid. We prefer to maintain the pH between 6.0 and 8.5, and desirably between 6.5 and 8.0. This is conveniently accomplished by addition of urea or ammonia as necessary during the fermentation, although bases such as alkali metal hydroxides, either alone or in combination with ammonium hydroxide, may be employed if desired. We carry out the fermentations at temperatures of about 26–34° C., although the preferred temperature will vary depending upon the microorganism being employed.

The fermentation is conducted under aerobic conditions for a period of from about 24–72 hours and preferably for about 38–60 hours. With most organisms, fermentation times of about 48 hours give highly satisfactory results. At the end of this time, substantial amounts of glutamic acid, i.e. in excess of 15 grams per liter, have been accumulated even in a medium containing excessive amounts of biotin as long as an inhibitor such as penicillin has been added in accordance with the present invention.

The glutamic acid thus produced may be recovered from the medium by methods known in the art. These include absorption on and elution from suitable ion exchange resins, removal of the cells and concentration of the filtrate containing glutamic acid, and/or absorption on acid-washed alumina and elution therefrom with dilute hydrochloric acid.

In carrying out the process of our invention, the particular microorganism employed in the fermentation is not critical and any biotin-dependent, glutamic acid-producing organism is suitable. These include bacteria, yeasts and fungi such as glutamic acid-producing strains of *Bacillus subtilis, Escherichia coli, Micrococcus glutamicus, Bacillus megaterium-Bacillus cereus* intermediate types, *Brevibacterium divaricatum, Brevibacterium aminagenes, Arthrobacter globiforme, Bacillus megaterium, Brevibacterium alanicum, Brevibacterium lactofermentus* and the like.

The following examples illustrate methods of carrying out the present invention, but it is to be understood that they are given for purposes of illustration and not of limitation.

EXAMPLE 1

A. An aqueous medium having the following composition was prepared:

| | Percent (by weight) |
|---|---|
| $NH_4H_2PO_4$ | 0.1 |
| $(NH_4)_2HPO_4$ | 0.1 |
| $MgSO_4.7H_2O$ | 0.05 |
| $MnSO_4.4H_2O$ | 0.004 |
| $K_2SO_4$ | 0.3 |
| $(NH_4)_2SO_4$ | 0.2 |
| Urea | 0.5 |
| Hi-test molasses to give carbohydrate concentration of | 12.7 |

The ammonium sulfate and urea were each sterilized separately at 100° C., and the remainder of the medium sterilized at 120° C. for about one minute. The medium contains 37.5 parts per billion of biotin (from the molasses). 3.0 liters of this medium in a 5 liter fermentor equipped with agitator and air inlet were aseptically inoculated with 8% by volume of a growing culture of a biotin-requiring, glutamic acid-producing strain of an organism described by Kinoshita et al. as strain M-560 of *Micrococcus glutamicus* ("Taxonomical Study of Glutamic Acid Accumulating Bacteria, *Micrococcus glutamicus* nov. sp.," Bull. Agr. Chem. Soc. Japan, vol. 22, No. 3, pp. 176–185, 1958). A culture of this organism is on deposit in the American Type Culture Collection under ATCC No. 13761.

The fermentation was carried out at 33° C. with agitation (700 r.p.m.) and aeration (1.75 liter/min.). 20 ml. quantities of a sterile 30% aqueous solution of urea were added as necessary during the fermentation to maintain the pH between 7.0 and 8.0.

When the optical density of the fermentation whole broth reached 20 (10–20 hours), 4000 units of sterile potassium penicillin G per liter of broth were added to the fermentation.

At the end of 48 hours' fermentation time, the medium contained 40 gms./l. of glutamic acid.

B. In a second experiment carried out in the same manner as the fermentation described above, but without the addition of any penicillin, the medium contained 4 gms./l. of glutamic acid at the end of 48 hours.

The optical density measurements described in this and succeeding examples are carried out by removing a small portion of the fermentation broth and diluting 1 ml. of whole broth to a volume of 100 ml. with water. The density of the diluted sample is measured with a Beckman spectrophotometer at a wavelength of 700 m$\mu$. The density reading multiplied by 100 gives the optical density values referred to herein.

The fermentation broths are assayed for glutamic acid by the decarboxylase assay described in the publication, Manometric Techniques and Methods, by Umbreit, Burris and Stauffner, 3d ed., Burgess Publishing Co., p. 207.

The culture inoculum for the fermentations described above was prepared by growing the organism in a seed medium having the composition:

| | Percent |
|---|---|
| Glucose (anhydr.) | 5.0 |
| $KH_2PO_4$ | 0.05 |
| $K_2HPO_4$ | 0.05 |
| $MgSO_4.7H_2O$ | 0.025 |
| $FeSO_4.7H_2O$ | 0.001 |
| $MnSO_4.4H_2O$ | 0.001 |
| $(NH_4)_2SO_4$ | 0.5 |
| Urea | 0.5 |

Biotin 11 parts per billion.

The fermentation was carried out with agitation and aeration at 27.5° C. for 8–14 hours at a pH of 7.0–8.0 controlled by periodic additions of urea.

EXAMPLE 2

When the experiments of Examples 1A and 1B are repeated using as the microorganism the strain of organism described in Canadian Patent No. 562,728 as *Micrococcus glutamicus* strain No. 541 (ATCC No. 13058), similar results are obtained with respect to the quantities of glutamic acid produced with and without the addition of potassium penicillin G.

EXAMPLE 3

A series of 250 ml. Hinton shaker flasks each containing 35 ml. of a sterile aqueous medium having the composition:

| | Percent (by weight) |
|---|---|
| Dextrose (anhydr.) | 11.5 |
| $NH_4H_2PO_4$ | 0.1 |
| $(NH_4)_2HPO_4$ | 0.1 |
| $MgSO_4.7H_2O$ | 0.05 |
| $MnSO_4.4H_2O$ | 0.004 |
| $K_2SO_4$ | 0.3 |
| Urea | 0.5 |
| $(NH_4)_2SO_4$ | 0.2 |
| Biotin (as in Table I). | | were inoculated with a culture of the organism employed in Example 1, the flasks covered with sterile gauze, and shaken on a rotary shaker (2" thrust, 220 r.p.m.) at 33° C. for 48 hours, the pH being maintained between 7.0 and 8.0 by the periodic addition of a sterile solution of urea. As set forth in Table I, sterile potassium penicillin G was added to certain of the flasks after fermentation had started. The individual flasks were assayed for glutamic acid after 48 hours. The results are set forth in Table I.

*Table 1*

| Flask | Biotin, p.p.b. | Potassium penicillin, $\mu$/ml. | Age penicillin added, hrs. | Glutamic acid produced, g./l. |
|---|---|---|---|---|
| Expt. A. | | | | |
| 1 | 2.5 | 0 | | 39 |
| 2 | 2.5 | 0 | | 32 |
| 3 | 2.5 | 0 | | 33 |
| 4 | 37.5 | 2 | 2 | 29 |
| 5 | 37.5 | 2 | 2 | 26 |
| 6 | 37.5 | 2 | 4 | 32 |
| 7 | 37.5 | 2 | 4 | 38 |
| Expt. B. | | | | |
| 1 | 37.5 | 0 | | 3 |
| 2 | 37.5 | 0 | | 4 |
| 3 | 2.5 | 0 | | 39 |
| 4 | 2.5 | 0 | | 38 |
| 5 | 2.5 | 0 | | 40 |

EXAMPLE 4

Fermentations were carried out with the organism and under the conditions of Example 1 in the following media:

| | Medium A, percent | Medium B, percent |
|---|---|---|
| $NH_4H_2PO_4$ | 0.1 | 0.1 |
| $(NH_4)_2HPO_4$ | 0.1 | 0.1 |
| $MgSO_4.7H_2O$ | 0.05 | 0.05 |
| $MnSO_4.4H_2O$ | 0.004 | 0.004 |
| $K_2SO_4$ | 0.3 | 0.3 |
| $(NH_4)_2SO_4$ | 0.2 | 0.2 |
| Urea | 0.5 | 0.5 |
| Dextrose monohydrate | 12.5 | |
| Hi-test molasses to give carbohydrate concentration of | | 12.5 |
| Biotin | [1] 37.5 | [1] 37.5 |

[1] Parts per billion present in the molasses.

Potassium penicillin G (as a sterile aqueous solution) equal to 5000$\mu$/l. of broth was added to the fermentation with medium A when the optical density of the broth rose to about 6. This was one hour after fermentation had begun. A second equal addition of penicillin was made to fermenting medium A 38 hours after inoculation. No penicillin was added to medium B.

The following yields of glutamic acid were obtained:

|  | Age after inoculation | Glutamic acid, gms./l. |
|---|---|---|
| Medium A | 48 | 29 |
| Medium B | 46 | 4 |

EXAMPLE 5

Two fermentations were conducted with the organism and under the conditions of Example 1. When the optical density of the broth reached a value of about 20, 4 units of potassium penicillin G per ml. of broth were added to the first fermentor, and 100 units of potassium penicillin G per ml. of broth added to the other fermentor. At the end of 48 hours, 30 gms./l. of glutamic acid were present in the first fermentation, and 33 gms./l. of glutamic acid were found in the second fermentation.

EXAMPLE 6

A. An aqueous medium was prepared having the following composition:

|  | Percent (by weight) |
|---|---|
| $NH_4H_2PO$ | 0.1 |
| $(NH_4)_2HPO_4$ | 0.1 |
| $MgSO_4.7H_2O$ | 0.05 |
| $MnSO_4.4H_2O$ | 0.004 |
| $K_2SO_4$ | 0.3 |
| $(NH_4)_2SO_4$ | 0.2 |
| Urea | 0.4 |
| Swift #51 defoamer (by vol.) | 0.03 |
| Dextrose to give carbohydrate concentration of | 12.7 |
| Biotin, 2.5γ/liter. | |

The potassium sulfate and ammonium sulfate were sterilized together and the urea sterilized separately at 115° C., the biotin sterilized separately at 120° C., and the remainder of the medium sterilized at 115° C. 14,000 gallons of this medium in a fermentor equipped with agitator and air inlet were aseptically inoculated with 9.2% by volume of a growing culture of a biotin-requiring, glutamic acid-producing strain of an organism described by Kinoshita et al. as strain M-560 of *Micrococcus glutamicus* ("Taxonomical Study of Glutamic Acid Accumulating Bacteria, *Micrococcus glutamicus* nov. sp.," Bull. Agr. Chem. Soc. Japan, vol. 22, No. 3, pp. 176–185, 1958). A slant of this culture has been deposited in the American Type Culture Collection under ATCC No. 13761.

The fermentation was carried out at 33° C. with agitation (100 r.p.m.) and aeration (300 cu. ft./min.) under a positive pressure of 5 p.s.i.g. Proportions of a sterile 30% aqueous solution of urea were added as necessary during the fermentation to maintain the pH between 7.0 and 8.0.

B. After a fermentation period of 18 hours, an aliquot of the whole broth was removed. 200 ml. portions of this mixture were centrifuged and the supernatant liquor removed. To the wet cells was added an aqueous solution of 0.1 M phosphate buffer and the solution brought to a volume of 200 ml. Dextrose was added to give a final concentration of 7.5–8.0%. To this solution was added a small amount of pH indicator (phenol red-bromthymol blue) and this solution divided into portions of 35 ml. in Hinton shaker flasks. To these flasks was added biotin and phenoxymethyl penicillin in the quantities indicated in the following table. The flasks were covered with sterile gauze and shaken on a rotary shaker (2″ thrust, 220 r.p.m.) at 33° C. for 21½ hours, the pH being maintained between 7.0 and 8.0 by the periodic addition of a sterile solution of urea. At the end of 21½ hours the individual flasks were assayed for glutamic acid. The results are set forth below:

| Flask | Biotin, γ/liter | Antibiotic, units/ml. | Glutamic acid, mg./ml. |
|---|---|---|---|
| 1-4 | 35 | 0 | 14.1 |
| 5-8 | 35 | 3.5 | 31.3 |
| 9-12 | 35 | 35.0 | 35.9 |
| 13-16 | 35 | 100 | 36.9 |

EXAMPLE 7

The experiment of Example 6 was repeated except that the aliquot of whole broth was removed after a 14-hour fermentation period, and a 7.5% dextrose concentration and a 24-hour incubation period were employed in the procedure of Example 6B.

The antibiotic used was α-phenoxyethyl penicillin (Syncillin) instead of phenoxymethyl penicillin. The following results were obtained:

| Flask | Biotin, γ/liter | Antibiotic, units/ml. | Glutamic acid, mg./ml. |
|---|---|---|---|
| 1-4 | 35 | 0 | 4.1 |
| 5-8 | 35 | 3.5 | 33.2 |
| 9-12 | 35 | 35.0 | 36.0 |
| 13-16 | 35 | 100 | 37.3 |

EXAMPLE 8

Example 6 was repeated with the following modifications: the aliquot of broth was removed from the fermentation after 20 hours, the incubation of Example 6B was carried out for 21 hours using a dextrose concentration of 7.5%. Oxamycin was added to the flasks instead of phenoxymethyl penicillin. The following results were obtained:

| Flask | Biotin, γ/liter | Oxamycin, γ/ml. | Glutamic acid, mg./ml. |
|---|---|---|---|
| 1-4 | 35 | 0 | 2.4 |
| 9-12 | 35 | 300 | 27.2 |
| 13-16 | 35 | 500 | 30 |

EXAMPLE 9

A series of 250 ml. Hinton shaker flasks each containing 35 ml. of a sterile aqueous medium having the composition:

|  | Percent (by weight) |
|---|---|
| Dextrose | 11.5 |
| $NH_4H_2PO_4$ | 0.1 |
| $(NH_4)_2HPO_4$ | 0.1 |
| $MgSO_4.7H_2O$ | 0.05 |
| $MnSO_4.4H_2O$ | 0.004 |
| $K_2SO_4$ | 0.3 |
| Urea | 0.5 |
| $(NH_4)_2SO_4$ | 0.2 |
| Biotin, 37.5 parts per billion. | |
| Phenol red indicator | 0.0005 |
| Bromthymol blue indicator | 0.0005 | were inoculated with a biotin-requiring, glutamic acid-producing culture of the organism *Micrococcus glutamicus*, the flasks covered with sterile gauze, and shaken on a rotary shaker (2″ thrust, 220 r.p.m.) at 33° C. for 48 hours, the pH being maintained between 7.0 and 8.0 by the periodic addition of a sterile solution of 15% urea. As set forth in the following table, various substances were added to groups of the flasks after fermentation had begun. The flasks were assayed for glutamic acid after 48 hours.

Table II

| Flask | Antibiotic | γ/ml. | Age antibiotic added | Glutamic acid produced,[1] g./l. |
|---|---|---|---|---|
| 1-2 | Oxytetracycline | 7 | 4 | 6 |
| 3-4 | do | 10 | 5 | 10.5 |
| 5-6 | do | 9 | 6 | 17 |
| 7-8 | do | 8 | 7 | 14.5 |
| 9-10 | do | 7 | 8 | 8 |
| 11-14 | do | 0 | -------- | 4 |
| 1-2 | Dihydrostreptomycin sulfate | 4 | 3 | 8 |
| 3-4 | do | 4 | 4 | 9 |
| 5-6 | do | 0 | -------- | 4 |
| 1-2 | Novobiocin | 1,000 | 2 | 17 |
| 3-4 | do | 1,000 | 3 | 14 |
| 5-6 | do | 1,000 | 4 | 14 |
| 7-8 | do | 0 | -------- | 3.5 |
| 1-2[2] | Neomycin sulfate | 350 | 3 | 10 |
| 3-4 | do | 200 | 4 | 10.5 |
| 5-6 | do | 400 | 4 | 8 |
| 7-10 | do | 250 | 5 | 12 |
| 11-14 | do | 300 | 6 | 14 |
| 15-16 | do | 150 | 7 | 10 |
| 17-18 | do | 200 | 8 | 13 |
| 19-22 | do | 0 | -------- | 6 |

[1] Average of flasks.
[2] Medium contained 35 p.p.b. of biotin.

EXAMPLE 10

A. A fermentation was conducted according to the procedure of Example 6A. After an 18-hour fermentation time an aliquot portion of the whole broth was removed. 200 ml. portions of the aliquot were centrifuged, and the supernatant discarded. The wet cells thus obtained were mixed with 0.1 M phosphate buffer to give a final volume of 200 ml. Dextrose was added to a concentration of 7.8%, as was a small amount of phenol red-bromthymol blue pH indicator solution. 35 ml. portions of the resulting resting cell suspensions were charged to Hinton shaker flasks. Biotin and oxytetracycline in the quantities indicated in the following table were added to the individual flasks. The flasks were then covered with sterile gauze and shaken on a rotary shaker (2" thrust, 220 r.p.m.) at 33° C. for 22½ hours. The pH was maintained between 7 and 8 by addition (as required) of a sterile solution of urea. After 22½ hours the flasks were assayed for glutamic acid content. The results are shown in the following table, the glutamic acid figures being an average of 4 flasks:

| Flask | Biotin, γ/liter | Oxytetracycline, γ/ml. | Glutamic acid, mg./ml. |
|---|---|---|---|
| a-d | 0 | 0 | 37.4 |
| e-h | 35 | 0 | 3.2 |
| i-l | 35 | 5 | 22.2 |
| m-p | 35 | 10 | 23.9 |
| q-t | 35 | 20 | 22.8 |
| u-x | 0 | 5 | 34.5 |

B. The effect of chloramphenicol, oxytetracycline and other compounds was determined by repeating the above experiment with the following modifications: the cells were collected after 19 hours' fermentation time, the dextrose concentration was 7.5%, and the washed cell suspension was incubated for 16 hours instead of 22½ hours. The following results were obtained:

| Flask | Biotin, γ/l. | Inhibitor | Concentration of inhibitor | Glutamic acid mg./ml. |
|---|---|---|---|---|
| 1-4 | 20 | ------- | ------- | 6.9 |
| 5-6 | 20 | Chloramphenicol | 8γ/ml. | 19.4 |
| 7-8 | 20 | do | 5γ/ml. | 15.0 |
| 9-10 | 20 | Resorcinol | 0.3% | 11.8 |
| 11-12 | 20 | Oxytetracycline | 8γ/ml. | 20.3 |
| 13-14 | 20 | Chlortetracycline | 8γ/ml. | 19.7 |
| 15-16 | 20 | Cetyltrimethylammonium bromide. | 0.005% | 14.6 |
| 17-18 | 20 | Sodium propionate | 0.1% | 15.4 |

EXAMPLE 11

A fermentation medium having the following composition was prepared:

| | Gms./l. |
|---|---|
| Dextrose (anhydr.) | 45.0 |
| $(NH_4)_2HPO_4$ | 1.0 |
| $(NH_4)H_2PO_4$ | 1.0 |
| $MgSO_4 \cdot 7H_2O$ | 0.5 |
| $FeSO_4 \cdot 7H_2O$ | [1] 10 |
| $MnSO_4 \cdot 1H_2O$ | [1] 40 |
| $(NH_4)_2SO_4$ | 2.0 |
| $K_2SO_4$ | 3.0 |
| Urea | 5.0 |
| Biotin | [2] 100 |
| Distilled $H_2O$ to 1 l. | |

[1] Mg.  [2] Micrograms.

The medium was sterilized by heating to 120° C., 15 p.s.i. 40 ml. of the medium was added to each of a series of 250 ml. baffled flasks and each flask inoculated with 0.4 ml. of a sterile aqueous suspension of cells of the organism used in Example 1. The inoculum was obtained by suspending a Blake bottle agar culture of the organism in 15 ml. of sterile water. The fermentation was carried out on a shaker rotating at 220 r.p.m. at 28° C.

To some of the flasks an inhibitor was added after the fermentation had proceeded for 12 hours. The amount of cell growth, the amounts of extracellular and intracellular glutamic acid produced and the ratio of glutamic acid in the fermentation broth and in the cells was determined at periodic intervals. The results are set forth in the following tables.

In Table I below are presented the results of experiments in which no inhibitor was added. The fermentations, the results of which are reported in Table II, were carried out in the same manner as Table I except that 40 units of sodium penicillin G was added after 12 hours of fermentation.

Table I

| Age, hr. | Cell growth dry weight, mg./ml. | pH | Glutamic acid | | Ratio, glutamic acid broth/cells |
|---|---|---|---|---|---|
| | | | Cells, μg./mg. | Super. μg./ml. | |
| 8 | 0.44 | 8.1 | 17.2 | 40 | 5.3 |
| 10 | 1.32 | 8.1 | 21.4 | 58 | 2.06 |
| 12 | 1.77 | 8.1 | 23.4 | 69 | 1.66 |
| 14 | 7.97 | 7.6 | 25.9 | 91 | 0.44 |
| 16 | 10.3 | 6.7 | 29.6 | 129 | 0.39 |
| 18 | 9.82 | 5.7 | 27.2 | 237 | 0.89 |
| 20 | 5.92 | 5.3 | 8.5 | 194 | 3.86 |
| 22 | 10.9 | 5.2 | 12.5 | 333 | 2.46 |

Table II

| Age, hr. | Cell growth dry weight, mg./ml. | pH | Glutamic acid | | Ratio, glutamic acid broth/cells |
|---|---|---|---|---|---|
| | | | Cells, μg./mg. | Super, μg./ml. | |
| 8 | 0.75 | 8.35 | 20.0 | 25 | 1.67 |
| 10 | 2.22 | 8.25 | 30.0 | 35 | 0.52 |
| 12 | 3.68 | 8.15 | 34.0 | 73 | 0.58 |
| 14 | 2.96 | 7.8 | 6.2 | 641 | 36.00 |
| 16 | 2.54 | 8.0 | 2.7 | 1,580 | 220.0 |
| 18 | 2.81 | 7.4 | 3.8 | 3,110 | 280.0 |
| 20 | 2.17 | 7.65 | 6.2 | 3,660 | 280.0 |
| 22 | 2.22 | 7.5 | 6.1 | 4,790 | 340.0 |
| 24 | 2.62 | 6.0 | 10.0 | 6,970 | 270.0 |

Tables III, IV and V appearing below contain the results of similar experiments wherein 400γ/ml. of novobiocin were added at the 12-hour period (Table III), 10γ of streptomycin per ml. of fermentation broth, as the streptomycin calcium chloride complex, were added after 12 hours of fermentation (Table IV), and 15γ/ml. of sodium cephalosporin C per ml. of fermentation broth were added after 12 hours (Table V).

Table III

| Age, hr. | Cell growth dry weight, mg./ml. | pH | Glutamic acid Cells, γ/mg. | Glutamic acid Super, γ/ml. | Ratio, glutamic acid broth/cells |
|---|---|---|---|---|---|
| 8 | 0.22 | 8.1 | 16.3 | 19 | 5.2 |
| 10 | 0.79 | 8.2 | 25.7 | 39 | 1.95 |
| 12 | 1.64 | 8.25 | 33.3 | 64 | 1.08 |
| 14 | 2.05 | 8.3 | 19.8 | 154 | 3.85 |
| 16 | 2.22 | 8.35 | 15.6 | 282 | 8.15 |
| 18 | 3.39 | 8.2 | 12.8 | 598 | 13.8 |
| 20 | 4.78 | 7.95 | 11.6 | 1,122 | 20.3 |
| 22 | 2.92 | 8.35 | 10.5 | 1,051 | 33 |
| 24 | 2.96 | 8.4 | 8.2 | 1,401 | 57.5 |
| 24 (control) | 10.82 | 5.4 | 9.4 | 278 | 2.72 |

Table IV

| Age, hr. | Cell growth dry weight, mg./ml. | pH | Glutamic acid Cells, γ/mg. | Glutamic acid Super, γ/ml. | Ratio, glutamic acid broth/cells |
|---|---|---|---|---|---|
| 8 | 0.58 | 8.2 | 21.2 | 39 | 3.2 |
| 10 | 1.00 | 8.2 | 16.0 | 45 | 2.8 |
| 12 | 2.10 | 8.0 | 26.7 | 40 | 0.71 |
| 14 | 3.65 | 7.85 | 31.6 | 243 | 2.1 |
| 16 | 6.12 | 7.0 | 30.3 | 399 | 2.15 |
| 18 | 6.84 | 7.1 | 23.5 | 998 | 6.2 |
| 20 | 3.74 | 7.8 | 10.0 | 1,328 | 35 |
| 22 | 3.65 | 8.0 | 4.55 | 1,488 | 89 |
| 24 | 7.66 | 5.95 | 7.1 | 1,329 | 24.6 |
| 24 (control) | 11.67 | 5.45 | 8.8 | 273 | 2.7 |

Table V

| Age, hr. | Cell growth dry weight, mg./ml. | pH | Glutamic acid Cells, γ/mg. | Glutamic acid Super, γ/ml. | Ratio, glutamic acid broth/cells |
|---|---|---|---|---|---|
| 8 | 1.81 | 8.3 | 13.6 | 34 | 1.38 |
| 10 | 2.34 | 8.3 | 21.0 | 39 | 0.79 |
| 12 | 4.86 | 8.05 | 24.4 | 40 | 0.34 |
| 14 | 5.29 | 7.7 | 0.8 | 900 | 214 |
| 16 | 5.11 | 7.45 | 0.93 | 2,389 | 504 |
| 18 | 7.29 | 6.2 | 1.55 | 3,556 | 314 |
| 20 | 6.12 | 5.3 | 2.07 | 5,880 | 465 |
| 22 | 6.68 | 5.1 | 1.44 | 5,490 | 570 |
| 24 | 9.38 | 5.0 | 0.84 | 3,970 | 500 |
| 24 (control) | 14.98 | 5.5 | 10.1 | 343 | 0.225 |

Any departure from the above description which conforms to the present invention is intended to be included within the scope of the claims.

What is claimed is:

1. An improved process for producing L(+)-glutamic acid that comprises growing a biotin-requiring, glutamic acid-producing microorganism in a nutrient medium containing biotin in excess of the amount required for optimum production of glutamic acid under aerobic conditions at a pH of between 6.0 and 8.5, and adding penicillin to said fermenting medium after substantial growth of the microorganism has taken place, the amount of penicillin so added being sufficient to cause a decrease of intracellular glutamic acid to a level less than half that of a fermentation conducted without addition of penicillin, while simultaneously increasing the ratio of extracellular to intracellular glutamic acid to a value of greater than 50, and recovering L(+)-glutamic acid.

2. In a process for producing L(+)-glutamic acid by fermentation of a nutrient medium with a biotin-requiring microorganism at a pH between 6.0 and 8.5, wherein the nutrient medium contains biotin in excess of the amount required for substantial growth of the organism, the step that comprises adding penicillin to the fermenting medium after substantial growth of the microorganism has taken place, the amount of penicillin so added being sufficient to cause a decrease of intracellular glutamic acid to a level less than half that of a fermentation conducted without addition of penicillin, while simultaneously increasing the ratio of extracellular to intracellular glutamic acid to a value of greater than 50.

3. In a process for producing L(+)-glutamic acid by fermentation at a pH of between 6.0 and 8.5 of a nutrient medium containing in excess of about 5 parts per billion of biotin with a biotin-requiring, glutamic acid-producing microorganism, the improvement that comprises adding to the fermenting medium after substantial growth of the microorganism has taken place, the amount of penicillin so added being sufficient to cause a decrease of intracellular glutamic acid to a level less than half that of a fermentation conducted without addition of penicillin, while simultaneously increasing the ratio of extracellular to intracellular glutamic acid to a value of greater than 50.

4. The process of claim 3 wherein an alkali metal salt of penicillin G is added to the fermentation medium.

5. In a process for producing L(+)-glutamic acid by fermentation of a nutrient medium with a biotin-dependent microorganism at a pH of between 6.0 and 8.5, wherein said medium contains in excess of about 5 parts per billion of biotin, the step that comprises adding to the fermentation broth when the optical density of said broth is about 15, the amount of penicillin so added being sufficient to cause a decrease of intracellular glutamic acid to a level less than half that of a fermentation conducted without addition of penicillin, while simultaneously increasing the ratio of extracellular to intracellular glutamic acid to a vaue of greater than 50.

6. A process for production of L(+)-glutamic acid by fermentation of a nutrient medium with a biotin-requiring, glutamic acid-producing microorganism that comprises adding an inhibitor to the fermentation medium, such inhibitor being one which causes a decrease of intracellular glutamic acid to a level less than half that of a fermentation conducted without inhibitor, while simultaneously increasing the ratio of extracellular to intracellular glutamic acid to a value of greater than 50, such process being conducted within the pH range of 6.0 to 8.5.

7. In a microbiological process for preparing L(+)-glutamic acid by fermentation of a nutrient medium with a biotin-requiring, glutamic acid-producing microorganism at a pH of between 6.0 and 8.5, wherein said nutrient medium contains biotin in excess of the amount required for optimum production of glutamic acid, and recovery of said acid from the medium, the improvement that comprises adding a growth inhibitor to the fermenting medium subsequent to the inoculation of the medium with said organism the amount of such inhibitor being sufficient to cause a decrease of intracellular glutamic acid to a level less than half that of a fermentation conducted without inhibitor, while simultaneously increasing the ratio of extracellular to intracellular glutamic acid to a value of greater than 50.

8. In a microbiological process for preparing L(+)-glutamic acid by fermentation of a nutrient medium with a biotin-requiring, glutamic acid-producing microorganism at a pH of between 6.0 and 8.5, wherein said nutrient medium contains biotin in excess of the amount required for optimum production of glutamic acid, and recovery of said acid from the medium, the improvement that comprises adding an antibacterial agent to the fermenting medium subsequent to the inoculation of the medium with said organism the amount of said antibacterial agent being sufficient to cause a decrease of intracellular glutamic acid to a level less than half that of a fermentation conducted without antibacterial agent, while simultaneously increasing the ratio of extracellular to intracellular glutamic acid to a value of greater than 50.

9. In a microbiological process for preparing L(+)-glutamic acid by fermentation of a nutrient medium with a biotin-requiring, glutamic acid-producing microorganism at a pH of between 6.0 and 8.5, wherein said nutrient medium contains biotin in excess of the amount required for optimum production of glutamic acid, and recovery of said acid from the medium, the improvement that comprises adding penicillin to the fermenting medium subsequent to the inoculation of the medium with said organism the amount of said penicillin being sufficient to cause a decrease of intracellular glutamic acid to a level less than half that of a fermentation conducted without penicillin, while simultaneously increasing the ratio of extracellular to intracellular glutamic acid ot a value of greater than 50.

10. In a process for producing L(+)-glutamic acid by fermentation of a nutrient medium with a biotin-dependent, glutamic acid-producing microorganisms at a pH of between 6.0 and 8.5 wherein said medium contains in excess of about 5 parts per billion of biotin, the step that comprises adding to the fermentation broth from about 0.05 to 100 units/ml. of penicillin subsequent to inoculation of the medium with said organism.

11. In a process for producing L(+)-glutamic acid by fermentation of a nutrient medium with a biotin-dependent, glutamic acid-producing strain of *Micrococcus glutamicus* at a pH of between 6.0 and 8.5, wherein said medium contains in excess of about 5 parts per billion of biotin, the step that comprises adding to the fermentation broth from about 0.05 to 100 units/ml. of penicillin subsequent to inoculation of the medium with said organism.

12. An improved process for producing L(+)-glutamic acid that comprises growing a biotin-requiring, glutamic acid-producing microorganism in a nutrient medium containing biotin in excess of the amount required for optimum production of glutamic acid under aerobic conditions at a pH of between 6.0 and 8.5, adding an inhibitor to said nutrient medium after substantial growth of the microorganism has taken place, the amount of said inhibitor being sufficient to cause a decrease of intracellular glutamic acid to a level less than half that of a fermentation conducted without inhibitor, while simultaneously increasing the ratio of extracellular to intracellular glutamic acid to a value of greater than 50, and recovering L(+)-glutamic acid from said medium.

References Cited in the file of this patent
FOREIGN PATENTS
562,728   Canada _____ Sept. 2, 1958

OTHER REFERENCES

Gayle et al.: Biochemical Journal, vol. 48, pages 298–300, Cambridge University Press, London, 1951.

UNITED STATES PATENT OFFICE
CERTIFICATE OF CORRECTION

Patent No. 3,080,297            March 5, 1963

Thomas Phillips et al.

It is hereby certified that error appears in the above numbered patent requiring correction and that the said Letters Patent should read as corrected below.

Column 12, line 7, beginning with ", the amount of", strike out all to and including "greater than 50.", in line 12, same column 12, and insert instead -- from about 0.05 to 100 units of penicillin per milliliter of medium. --; same column, line 21, beginning with ", the amount of", strike out all to and including "greater than 50.", in line 26, same column 12, and insert instead -- to 30 from about 0.05 to 100 units of penicillin per milliliter of broth. --; column 13, line 4, for "ot" read -- to --; line 8, for "microorganisms" read -- microorganism --.

Signed and sealed this 24th day of December 1963.

(SEAL)

Attest:

ERNEST W. SWIDER

Attesting Officer

EDWIN L. REYNOLDS

Acting Commissioner of Patents